Nov. 29, 1927.
W. H. FULTON
1,651,022
HOSE CONSTRUCTION
Filed Sept. 28, 1920
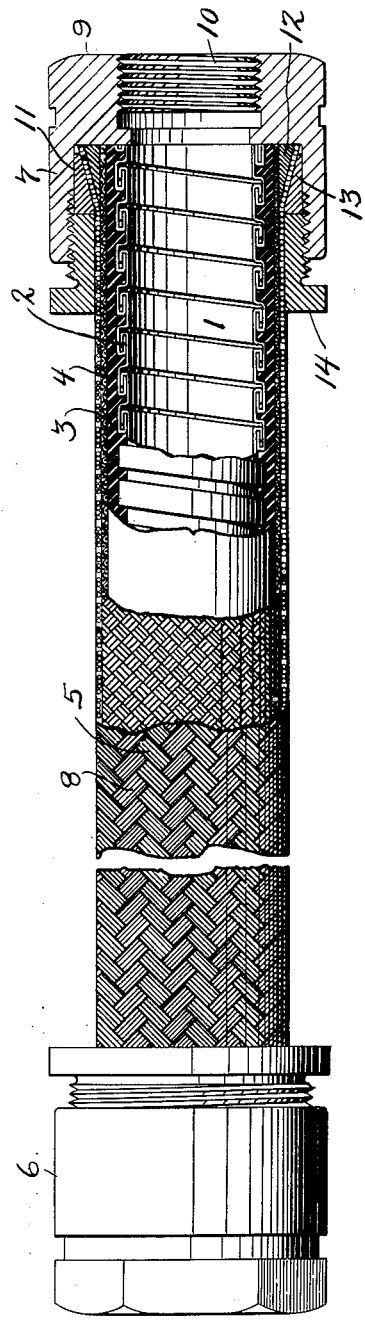
INVENTOR
William H. Fulton
BY Thomas Howe
ATTORNEY Patented Nov. 29, 1927.

1,651,022

UNITED STATES PATENT OFFICE.

WILLIAM H. FULTON, OF IRVINGTON, NEW JERSEY, ASSIGNOR, BY MESNE ASSIGNMENTS, TO TITEFLEX METAL HOSE CO., A CORPORATION OF NEW JERSEY.

HOSE CONSTRUCTION.

Application filed September 28, 1920. Serial No. 413,270.

This invention relates to flexible hose or pipe.

The main object of the present invention is to provide a tube or hose which, while flexible, shall be fluid tight, shall be able to withstand high pressures, and which shall not be affected injuriously by the matter passing through the tube.

A further object of the invention is to provide a tube of the character indicated which shall lend itself readily to processes of manufacture.

A further object of the invention is to provide a tube of the character indicated which shall not be liable to injury by stresses to which it may be subjected in its handling or use.

Other and ancillary objects of the invention will appear hereinafter.

In the drawing, wherein the invention is illustrated, is shown a hose or tube with couplings at its ends, embodying the invention, the structure being shown partially in side elevation and partly in section with portions broken away to show intermediate portions.

Referring to the drawing the tube comprises a flexible interior lining or tube 1 consisting of a helically disposed strip of brass having the edges of adjacent convolutions interfolded as shown at 2, the joints formed by the interfolding having clearances as shown so that the interfolded parts may slide as the tube is flexed.

To the outside of the tube 1 is applied a continuous rubber coating 3 which completely envelopes the tube 1. This rubber tube is formed by vulcanizing rubber applied to the tube 1 and secured firmly in position by a spiral textile or braided fabric 4, sufficient pressure being applied to the rubber during vulcanization so as to obtain a dense rubber tube. During the vulcanization the rubber will enter the crevices of the interior tube 1 as shown so as to be thoroughly incorporated with it and form a fluid tight covering about it. During the vulcanizing process also the fabric 4 is pressed into and becomes embedded in the rubber so that the latter is held in shape and strengthened by it.

The tube as thus far formed, however, is open to the objection that if twisting strains are applied to the structure, the inner lining or tube may slide in its joints and so deleteriously affect their original structure if in fact the rubber of the tube is not seriously damaged. Also the tube is not of great strength as to tensile stresses exerted longitudinally of the structure. Accordingly there is placed upon the outside of the rubber tube 3 and fabric 4 a metal structure which comprises a helically wound strand 5 which has its ends secured to the couplings 6 and 7 at the ends of the tube. This will prevent relative turning or twisting of the couplings about the axis of the tube in one direction. By winding another strand 8 about the tube in the opposite direction from the strand 5 and securing its ends to the couplings 6 and 7, relative turning of the couplings and consequent twisting of the tube structure in the other direction will be prevented. It is generally desirable that there should be a number of strands wound in each direction and interwoven as shown in the drawing.

With the structure as described any pull upon the tube structure or pressure exerted therein will tend to cause an elongation when the outer armor composed of the strands as 5 and 8 will contract in diameter thereby the more firmly resisting the internal pressure and, pressing upon the rubber layer or tube, causes it to be hugged the tighter and more securely to the flexible metal tube constituting the inner lining. Furthermore any longitudinal strain upon the structure is taken up by the exterior armor which is fastened to the couplings at its ends. In order that the relatively broad strands as 5 and 8 may adapt themselves to the surface of the rubber tube and so hold the same in position more efficiently, each of the strands of the outer armor is composed of a number of metal wires or filaments laid alongside each other as shown in the drawing.

The couplings 6 and 7 are alike so that a description of one of them will apply to both. Referring therefore to the coupling 7 it will be seen that it comprises a body portion 9, having a threaded portion 10 for securing it to any device to which it may be desired to connect the tube. It also comprises a socket 11 within which is inserted the end of the tube structure as described. Inserted between the outer armor including the strands as 5 and 8, and the rubber portion 3, is a circular ring 12 of tapered longitudinal section as shown. Outside the outer armor where it rests upon the ring 12 is a similar but oppositely tapered ring 13 which fits within the socket 11. This ring 13 is urged towards the bottom of the socket by means of an internal nut or gland 14. The end of the outer armor therefore is securely clamped between the rings 12 and 13 as the latter is forced inwardly by screwing up the gland 14. This securing of the outer armor also forces the end of the rubber tube against the bottom of the socket so that leakage of fluid between the coupling and the end of the tube is prevented.

The structure described lends itself admirably to all high pressure service and especially where oil or grease which would act deleteriously on the rubber, is conveyed. The rubber, however, insures fluid tightness and the inner metal lining not only prevents destructive action on the rubber but also in conjunction with the metal cover or armor serves to confine the rubber up to a point of final destruction.

It is to be observed that in cases where oil or grease is forced through the tube under high pressure, the outer armor takes the end strain and when the pressure comes on the structure elongates causing the wire braid to support the rubber tube inside it firmly and prevents the inner tube from being pushed back through the fitting, at the same time wrapping the wire braid down firmly over the rubber tube to support it against longitudinal pressure. The interior flexible metal tube or lining should be made reasonably tight so as to prevent any such contact of the substance conveyed with the rubber tube that it would be deleterious thereto. In the case of greases, thick oils or other highly viscous fluids the tightness of the inner metal tube need not be so perfect as in the case of thinner fluids as obviously the more viscous substance would not leak through the tube as readily as the thinner substance.

While the invention has been illustrated in what is considered its best application, it may have other embodiments without departing from its spirit and is not, therefore, limited to the structure shown in the drawing.

What I claim is:

1. The combination with a hose comprising a flexible metallic tube, a continuous tube of rubber surrounding said metallic tube and intimately associated therewith and substantially inextensible metal strands extending helically in opposite directions on the outside of said rubber tube, of a coupling at each end of said hose and to which the ends of the hose are secured, the said metal strands being secured at their ends to said couplings, the first mentioned metallic tube and the said rubber tube being unsecured to said couplings except through said strands.

2. A hose comprising in combination, a flexible metallic tube, a continuous tube of rubber surrounding said metallic tube and intimately associated therewith, a fabric about said rubber tube and substantially inextensible metal strands extending helically in opposite directions on the outside of said fabric and intimately associated therewith.

In testimony whereof I have signed this specification this 3rd day of September, 1920.

WILLIAM H. FULTON.